Patented Apr. 16, 1946

2,398,344

UNITED STATES PATENT OFFICE 2,398,344

STABLE EMULSIONS OF VINYL ESTERS

Henry Michael Collins and Mogens Kiar, Shawinigan Falls, Quebec, Canada, assignors to Shawinigan Chemicals Limited, West Montreal, Quebec, Canada, a corporation of Canada No Drawing. Application November 11, 1942, Serial No. 465,260. In Canada October 21, 1942

6 Claims. (Cl. 260—32)

INTRODUCTION

This invention relates to polymerization of vinyl esters in emulsion.

There are relatively few emulsifiers which are operative to maintain the stability of such an emulsion over the relatively wide range of temperatures incidental to the polymerization process. One suggestion is made in U. S. Patent No. 2,227,163, which discloses the polymerization of polyvinyl acetate in aqueous emulsion using as an emulsifier polyvinyl alcohol or its water-soluble derivatives. The alcohol itself is the only such body exemplified.

The applicant has found that polyvinyl alcohol and certain of its water-soluble derivatives are in many respects ineffective in producing stable aqueous emulsions of polyvinyl esters. In some cases, while emulsions can be formed, they are either unstable or inherently unstable. In other cases, stability is achieved only when a considerable amount of monomeric vinyl ester remains in the emulsion.

OBJECTS

Having regard to these circumstances, it is an object of the present invention to provide stable aqueous emulsions of polyvinyl esters low in residual monomer; a process of emulsifying by the use as emulsifiers of certain partially hydrolyzed polyvinyl acetates effective to form stable emulsions low in residual vinyl ester; a process in which foaming during the mixing of the constituents is reduced to a minimum.

These objects are accomplished by employing as emulsifiers, in the emulsion polymerization of vinyl esters, partially hydrolyzed polyvinyl acetates having an acetate group content of between about 10 percent and about 43 percent. These materials are effective at concentrations between about 1 and about 6% by weight of the total charge to form an emulsion having a polyvinyl acetate content ranging from about 30% to about 70% by weight and to protect the emulsion during polymerization and afterwards under the normal conditions of handling and storage. Conversion of the monomer to a polymer having a viscosity within the useful range, i. e., from about 1.5 to about 300 centipoises, can be carried to substantial completion by conducting the polymerization for about 50 to about 300 minutes under reflux at a temperature from about 66° C. to about 90° C., in the presence of a peroxide catalyst at a concentration within the range effective to provide available oxygen from about .009% to about .47% by weight of the vinyl acetate so as to reduce the amount of monomer remaining in the emulsion to from about 2% to about .3% by weight of the emulsion without destroying the stability of the emulsion.

EXAMPLES

In order that the invention may be understood in more detail, various embodiments are illustrated in the following examples. These examples are intended as explanatory only and not limiting to the scope of the invention.

For polymerizing in emulsion according to the procedures to be described, an apparatus is employed having characteristics and dimensions approximately as follows. The container is an aluminum pot 8 inches high by 6 inches diameter having a concave bottom and no baffles. The stirrer is of stainless steel. It embodies half an inch from the bottom, 4 blades in a cluster 1 inch by half an inch bent at an angle of 45 degrees for downward thrust; four inches from the bottom a pair of blades 2½ inches by three quarters of an inch bent at an angle of 45 degrees for downward thrust. The useful speeds of the blades are about 500 to about 1500 revolutions per minute. The pot is equipped with a reflux condenser.

The following Examples 1 to 9 as given in Table 1, illustrate the use of various partially hydrolyzed polyvinyl acetates in the emulsion polymerization of vinyl esters. In these runs, the charge employed and the characteristics of the reaction are substantially as follows:

| Constituent | Approximate concentration and other factors |
|---|---|
| Emulsifier — partially hydrolyzed polyvinyl acetate having the acetate group content indicated in Table 1, and made from polyvinyl acetate of viscosity about 7 centipoises. | 2.5% by weight of the total charge. |
| Surface tension—"Aerosol O. T." depressant. | 0.1% by weight of the total charge. |
| Medium—water | 537 grams. |
| Monomer—vinyl acetate | 690 grams. |
| Catalyst—benzoyl peroxide | .69 grams (.1% on v. a.). |
| Stirring speed | 1,200 R. P. M. |
| Time of polymerization | 2 hours. |
| Temperature at reflux | Min. 66° C., max. 84° C. |

The water, emulsifier and depressant are put into solution and added to the remainder of the water in a kettle having the above described characteristics. This charge is then mixed by stirring rapidly for about one minute. To this solution the monomer is added slowly with stirring which is continued for about five minutes. The benzoyl peroxide catalyst is then added and the whole charge brought to reflux temperature of about 66° C. The run is completed when the temperature has reached the neighborhood of 80° C. to 85° C. The charge is then cooled and removed from the kettle.

The approximate results of using the different partially hydrolyzed polyvinyl acetates are indicated below in Table 1. These results are expressed in terms of stability as determined by certain tests developed by the applicant as follows:

(a) "The gravity settling test" consists of letting the emulsion stand for a time and then measuring the amount of precipitation i. e. sludging. If there has been substantially no precipitation in seventy-two hours, the emulsion is considered stable.

(b) "The hot stir test" consists of heating the emulsion from room temperature to about 60° C. with slow stirring at about 600 R. P. M. and then stirring the emulsion at about 1200 R. P. M. for about 5 minutes. If any substantial coagulation is observed after this time, the emulsion is considered unstable.

(c) "The viscosity increase test" consists of drawing a sample from the charge after polymerization, at about 80° C. allowing this sample to cool to about 20° C. without stirring and then measuring its viscosity. The bulk of the emulsion is then cooled to about 20° C. with stirring and its viscosity measured and compared with that of the first sample. If the viscosity of the sample cooled without stirring shows a marked increase (about 15 centipoises or more) over that of the emulsion cooled with stirring, instability is indicated. This is substantiated by microscopic examination which shows that the increase in emulsion viscosity is due to the coalescence of the particles of the emulsion, denoting instability.

(d) "The centrifuge test" consists in centrifuging the emulsion at about 1950 R. P. M. for about 20 minutes (about 20° C.).

The sludge resulting is recorded as a percentage of the total emulsion. Where the sludge content is substantially nil, the emulsion is considered good. Where there is a sludge content of about 10% or below, the emulsion is considered fair. Above 10%, the instability increases with the percentage.

(e) "Verification." The results of the above tests are verified by checking one against the other.

The results of the respective tests all indicate that the emulsions made with agents having an acetate group content of about 10% or over are stable. Those made with partially hydrolyzed polyvinyl acetates containing less than about 10% acetate groups were indicated as unstable. Other characteristics of all the stable emulsions were substantially as follows, after cooling.

Proportion of solids_____ 55 percent by weight of the total charge
Residual vinyl acetate___ 2 percent by weight of the total charge
Emulsion viscosity_____ 200 centipoises
pH_____ 5.0
Polymer viscosity_____ 125 centipoises
Particle size of the polyvinyl acetate. Between about $0.5\mu$ and about $4.0\mu$

*Example 10*

This example demonstrates that stable emulsions can be made with a partially hydrolyzed polyvinyl acetate having an acetate group content of less than 10%, provided a relatively high concentration of monomeric vinyl acetate remains therein.

The nature of the constituents of the charge, approximate concentrations and results of subjecting the charge to polymerization conditions substantially as in Examples 1–9 are as follows:

|  | Per cent |
|---|---|
| Partially hydrolyzed polyvinyl acetate having an acetate group content of about 5.8%, made from polyvinyl acetate having a viscosity of about 7 centipoises | [1] 2.5 |
| "Aerosol O. T." | [1] 0.1 |

[1] Taken by weight on the total charge.

|  | Grams |
|---|---|
| Water | 800 |
| Vinyl acetate | 900 |
| Benzoyl peroxide | 0.9 |

*Conditions of reaction*

| Stirring speed | 1200 R. P. M. |
|---|---|
| Time of polymerization | 1 hr., 10 mins. |
| Temperature at reflux | Max. 76° C., min. 66° C. |

*Resulting emulsion (after cooling)*

| Viscosity of the polymer | 51 centipoises |
|---|---|
| Emulsion-viscosity | 80 centipoises. |
| Residual vinyl acetate | 10 per cent by weight on the total charge |
| Percent solids | 40 per cent by weight on the total charge |

*Table 1*

| Hydrolyzed P. V. A. | "Gravity settling test" | "Hot stir test" | "Viscosity increase test" | | "Centrifuge test, per cent sludge" |
|---|---|---|---|---|---|
| | | | Increase in emulsion visc. | Microscopic data | |
| | | | Cps. | | |
| 2.5:7 | 30% ppted. in 72 hrs | Unstable | 120 | 80° normal fine / 20° 60% fine aggregate | 60 |
| 3.5:7 | 20% ppted. in 72 hrs | do | 100 | 80° normal fine / 20° 40% fine aggregate | 75 |
| 5.8:7 | 70% ppted. in 72 hrs | do | 130 | 80° normal fine / 20° 30% large aggregate | 100 |
| 7.8:7 | 20% ppted. in 72 hrs | do | 48 | 80° normal fine / 20° 10% large aggregate | 40 |
| 8.5:7 | 5% ppted. in 72 hrs | Moderately stable | 25 | 80° normal fine / 20° 5% large aggregate | 40 |
| 10:7 | Stable to 72 hrs | Stable | 15 | 80° normal fine / 20° normal fine, 4% coarse | 10 |
| 13:7 | do | do | 10 | 80° normal fine / 20° normal fine | 8 |
| 20:7 | do | do | 10 | 80° normal fine / 20° normal fine | 0 |
| 31:7 | do | do | −50 | 80° normal fine/coarse / 20° normal fine | 0 |

The charge was tested for stability substantially as in the preceding Examples 1 to 9 with the following approximate results.

Hot stir test_____ Stable
Centrifuge test_____ 0% sludge
Viscosity increase test____ 3 centipoises increase

EMULSIFYING AGENTS

In accordance with the invention, the partially hydrolyzed polyvinyl acetates which are useful as emulsifiers in producing stable emulsions are those having an acetate group content of between about 10% and about 43%, i. e., calculated on a weight basis as vinyl acetate. Those having an acetate group content of between about 10% and about 25% have the additional characteristic of forming an emulsion which does not foam during stirring. This is a distinct advantage, since, if the monomer in the emulsion tends to foam, the difficulties of controlling polymerization are such that the final emulsion is generally unstable. The tendency to foam is particularly pronounced where certain hydrophilic colloids are used in conjunction with the partially hydrolyzed polyvinyl acetate, for instance, as described in Collins co-pending application Serial No. 457,338, filed on Sept. 4, 1942, now U. S. Patent 2,388,601. The remainder of the range, namely, the partially hydrolyzed products having an acetate group content of between about 25% and about 43% are especially good emulsifiers, but do not possess the non-foaming advantage.

VISCOSITY-CONCENTRATION

The partially hydrolyzed products may be made from polyvinyl acetates having various viscosities within the range of about 1.5 to about 200 centipoises. The concentration will, however, vary with the viscosity of the polyvinyl acetate from which it is made. For instance, where the viscosity of the starting polyvinyl acetate is about 7 centipoises the preferred concentration for a partially hydrolyzed polyvinyl acetate having an acetate group content of about 31% is in the neighborhood of 2.5% calculated by weight on the total charge.

The preferred concentrations of agents made from polyvinyl acetates of other viscosities are those effective to form solutions in a given quantity of water of viscosity equivalent to a near 10% solution of an agent made from a polyvinyl acetate having a viscosity of about 7 centipoises. The operative concentration may vary between amounts effective to give solutions equivalent to those of between about 4.0% and about 15.0% of the 7-viscosity agent. The agent in all cases must, of course, have been hydrolyzed to the appropriate degree. The preferred agents are made from polyvinyl acetates of viscosity between about 7 centipoises and about 60 centipoises. The operative range of concentration will vary as noted above depending on the viscosity, between about 1.0% and about 6.0% calculated by weight on the total charge.

STABILIZING EFFECT

These emulsifiers are unique in being capable of stabilizing the emulsion-emulsoid over the relatively wide range of temperatures encountered. They are capable (a) of acting as a liquid/liquid phase emulsifier at the commencement of the process, at say about 20° C. (b) of protecting the emulsion at about 66° C. (the start of reflux) and finally, (c) of protecting the solid/liquid phase both at the maximum temperature encountered in polymerization at about 83° C. and afterwards at room temperature or lower, sometimes down to about 0°. The partially hydrolyzed polyvinyl acetates specified may also be used in combination with other emulsifying agents as for instance, disclosed in copending application, Serial No. 457,338, filed Sept. 4, 1942, H. M. Collins, now U. S. Patent 2,388,601.

SURFACE TENSION DEPRESSANT—STIRRING

The use of depressed surface tension also helps to obtain a stable emulsion and to eliminate the necessity for complex stirring, and is thus preferred. This condition may conveniently be accomplished by using a suitable depressant. "Aerosol O. T." (the sodium salt of the sulphonic acid of dioctyl succinic ester) is satisfactory. Other surface tension depressants may be used, as for instance, the other "Aerosols," "Aresklene," fatty acid soaps of hydroxyethyl ethylene diamine, fatty acid soaps of Merpentine, sulphonates of high alcohols and alkyl aryl type wetting agents. A criterion of utility in that the depressant has to be compatible and non-reactive with the other constituents of the charge. The concentration of surface tension depressant should be in the range of between about 0.05% and about 3.0%.

The type of stirring is not complicated as will be clear to one skilled in the art. It will vary somewhat with different types of equipment. In the particular equipment described above, which was used to carry out the procedures of the examples, the stirring should be of the order of between about 700 and about 1500 R. P. M. Where this speed is greater or less than this range, the emulsion tends to be unstable. At the low speeds great care should be taken to control reflux, rate of charging etc., to lessen foaming and other undesirable results. Partially hydrolyzed polyvinyl acetates having an acetate group content of between about 10% and about 25% acetate groups are characterized by causing considerably less foaming than other of the partially hydrolyzed bodies.

Preferred conditions for the particular apparatus described can be achieved by charging the vinyl acetate at a low rate, at say, about 500 grams per minute, operating the stirrer at a rate of about 1200 R. P. M. in the equipment aforementioned and operating at a low reflux rate, at about 1.0% of the total charge per hour.

THE CATALYST

Any organic or inorganic peroxide may be used as a catalyst in carrying out the reaction. Benzoyl peroxide or hydrogen peroxide are preferred. Hydrogen peroxide is employed preferably at a concentration of between about .02% and about 1.0% (available oxygen between about .009% and about .47%) calculated by weight on the monomer, supplemented by an amount of an alkaline accelerator such as, for instance, sodium bicarbonate, effective to bring the pH of the charge at the start of the reaction to between about 6.5 and about 9. Regulation of the proportions of catalyst to control the reaction and to give predetermined characteristics to the resulting polymer is taught by Kiar in copending application Serial No. 457,339, filed on Sept. 4, 1942. Where high concentrations of catalyst are employed, it may also be necessary to use small quantities of a controlling agent such as acetaldehyde to control the reaction and the characteristics of the resulting polymer as also taught by Kiar in the copending application referred to. The polymerization time will vary between about 50 minutes and about 300 minutes. The rate of addition of the vinyl ester may vary between about 2 and about 5 minutes. The ratio of vinyl acetate to water should be between about 30% and about 70% by weight.

Polymerization Procedure

In a characteristic procedure, the emulsifying agent is added to the water and the charge stirred for about 5 minutes. The catalyst is added with stirring, the vinyl acetate is added to the aqueous phase with stirring. The charge is then stirred for about 5 minutes after which it is brought to reflux temperature with stirring and gentle reflux kept up by the temperature manipulation until reflux temperature has gone from about 66° C. at commencement to about 84° C. at the finish. The charge is then cooled slowly with stirring to about 25° C. and drained.

Conversion of the monomer may be carried to substantial completion without destroying the stability of the emulsion. This is not possible with polyvinyl alcohol as the emulsifier. Generally the residual vinyl acetate remaining in an emulsion made according to the present invention is between about 0.3% and about 5.0% by weight of the emulsion so that the emulsion may be said to be substantially free from monomeric vinyl ester.

The Emulsoid

The emulsoid formed is stable up to the high temperatures reached in polymerization that is up to about 90° C. and down to the low temperatures that is about 0° C. which might be encountered in storage and transit when the usual precautions are taken. This stability may, for practical purposes, be considered as permanent, since it persists for the period demanded by the market. Generally, emulsions of this type are used within about six months or sooner.

The characteristics of the emulsions may be modified to some extent according to the particular conditions employed in its manufacture. The viscosity of the finished emulsoid may vary between about 100 centipoises and about 300 centipoises. The viscosity of the polyvinyl acetate may be varied between about 1.5 centipoises and about 300 centipoises, as for instance, disclosed in Kiar copending application Ser. No. 457,339. The high solid content of these emulsoids as compared with solutions is advantageous especially for film forming. Films may be laid down which are unexpectedly pliable and nonblocking. The polymer may also be recovered from the emulsion by precipitation with electrolytes, as for example, aluminum sulphate with ammonia, or boric acid.

The emulsoid may be modified by adding at any convenient time, solvents, plasticizers, fillers, pigments, etc., of the types usually employed with the particular polymer forming the dispersed phase and which are inert to the constituents of the charge. For instance, in the case of polyvinyl esters, suitable plasticizers are dibutylphthalate and "3 G. H." Suitable fillers are iron oxide and titanium oxide. Since these agents can usually be added after polymerization has been completed there is not thought to be any great advantage in adding them during the process.

Uses

There are many uses to which these resins may be applied in emulsoid or solid form, for instance:

As grease proof coatings for articles made of sheet fabrics such as cloth, paper and cardboard. They may be pigmented, filled and/or plasticized.

For impregnating porous materials.

As adhesives and heat sealing compositions.

For compounding with other materials, fillers, for example, to give tough, resilient end products.

As vehicles for carrying metal powders, dyes, carbon black and other electrically conductive solids.

As a chewing gum base.

As a vehicle to bind pigments in coatings.

Polymers Formed

While the invention has been described principally in connection with the polymerization of vinyl acetate since preferred results are achieved with this body, it may also be applied to the polymerization of other vinyl esters such as vinyl propionate, vinyl butyrate and vinyl chloride. Copolymerization of two or more vinyl esters may be accomplished.

Water has been named as the non-solvent vehicle for the emulsion. It will be understood that the monomeric substances can be polymerized in any non-solvent vehicle in which the emulsifying agents are operable, but water is most economical and is highly satisfactory.

The term "stable" is used to denote the capacity of the emulsion-emulsoid to retain its form as such for the period demanded by the market under the conditions encountered during polymerization and during commercial handling, in contrast to the tendency of many emulsion-emulsoids to "break" under these conditions.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

We claim:

1. A process of preparing a stable aqueous emulsion of polyvinyl acetate having a viscosity within the range from about 1.5 to about 300 centipoises, comprising, emulsifying in water vinyl acetate in the presence of a partially hydrolyzed polyvinyl acetate containing between about 10% and about 43% acetate groups at a concentration from about 1% to about 6% by weight on the total charge, the ratio of vinyl acetate to water being between about 30% and about 70% by weight, and heating and stirring said emulsion in the presence of a peroxide catalyst at a concentration selected from the range to provide available a concentration selected from the range to provide available oxygen from about .009% to about .47% by weight of the vinyl acetate for about 50 to 300 minutes under reflux at a temperature from about 66° C. to about 90° C. thereby to convert the monomer to a point where only from about three tenths to about two percent of monomer based on the weight of the emulsion remains and a stable emulsion is formed.

2. A process of preparing a stable aqueous emulsion containing a polyvinyl acetate, according to claim 1, wherein the partially hydrolyzed polyvinyl acetate has an acetate group content between about 10% and about 25%.

3. A process of preparing a stable aqueous emulsion containing a polyvinyl acetate, according to claim 1, wherein the partially hydrolyzed polyvinyl acetate has an acetate group content between about 25% and about 43%.

4. A process of preparing a stable aqueous emulsion containing polyvinyl acetate according to claim 1 wherein the partially hydrolyzed polyvinyl acetate has an acetate group content of about 13%.

5. A process of preparing a stable aqueous emulsion containing polyvinyl acetate according to claim 1 wherein the partially hydrolyzed polyvinyl acetate has an acetate group content of about 20%.

6. A process of preparing a stable aqueous emulsion containing polyvinyl acetate according to claim 1 wherein the partially hydrolyzed polyvinyl acetate has an acetate group content of about 31%.

HENRY MICHAEL COLLINS.
MOGENS KIAR.

Certificate of Correction

Patent No. 2,398,344.             April 16, 1946.

HENRY MICHAEL COLLINS ET AL.

It is hereby certified that the residence of the assignee in the above numbered patent was erroneously described and specified as "West Montreal, Quebec, Canada," whereas said residence should have been described and specified as *Montreal, Quebec, Canada*; as shown by the records of assignments in this office; page 4, second column, lines 61 and 62, claim 1, strike out the words "a concentration selected from the range to provide available"; and that the said Letters Patent should be read with these corrections therein that the same may conform to the record of the case in the Patent Office.

Signed and sealed this 6th day of August, A. D. 1946.

[SEAL]

LESLIE FRAZER,
*First Assistant Commissioner of Patents.*

3. A process of preparing a stable aqueous emulsion containing a polyvinyl acetate, according to claim 1, wherein the partially hydrolyzed polyvinyl acetate has an acetate group content between about 25% and about 43%.

4. A process of preparing a stable aqueous emulsion containing polyvinyl acetate according to claim 1 wherein the partially hydrolyzed polyvinyl acetate has an acetate group content of about 13%.

5. A process of preparing a stable aqueous emulsion containing polyvinyl acetate according to claim 1 wherein the partially hydrolyzed polyvinyl acetate has an acetate group content of about 20%.

6. A process of preparing a stable aqueous emulsion containing polyvinyl acetate according to claim 1 wherein the partially hydrolyzed polyvinyl acetate has an acetate group content of about 31%.

HENRY MICHAEL COLLINS.
MOGENS KIAR.

Certificate of Correction

Patent No. 2,398,344. April 16, 1946.

HENRY MICHAEL COLLINS ET AL.

It is hereby certified that the residence of the assignee in the above numbered patent was erroneously described and specified as "West Montreal, Quebec, Canada," whereas said residence should have been described and specified as *Montreal, Quebec, Canada*; as shown by the records of assignments in this office; page 4, second column, lines 61 and 62, claim 1, strike out the words "a concentration selected from the range to provide available"; and that the said Letters Patent should be read with these corrections therein that the same may conform to the record of the case in the Patent Office.

Signed and sealed this 6th day of August, A. D. 1946.

[SEAL]

LESLIE FRAZER,
*First Assistant Commissioner of Patents.*